United States Patent
Yuen et al.

(10) Patent No.: US 10,019,911 B2
(45) Date of Patent: Jul. 10, 2018

(54) COMPUTER-ASSISTED METHOD AND COMPUTER SYSTEM FOR TEACHING PIANO

(71) Applicant: Wai Yuk Annie Yuen, Ma Wan (HK)

(72) Inventors: Wai Yuk Annie Yuen, Ma Wan (HK); Joseph Reiser, Ma Wan (HK)

(73) Assignee: Wai Yuk Annie Yuen, Ma Wan (HK)

( * ) Notice: Subject to any disclaimer, the term of this patent is extended or adjusted under 35 U.S.C. 154(b) by 0 days.

(21) Appl. No.: 15/616,636

(22) Filed: Jun. 7, 2017

(65) Prior Publication Data

US 2017/0358237 A1 Dec. 14, 2017

(30) Foreign Application Priority Data

Jun. 8, 2016 (HK) .................. 16106647.6

(51) Int. Cl.
  *G09B 15/02* (2006.01)
  *G06F 3/0481* (2013.01)
  *G09B 15/04* (2006.01)

(52) U.S. Cl.
  CPC ......... *G09B 15/023* (2013.01); *G06F 3/0481* (2013.01); *G09B 15/04* (2013.01)

(58) Field of Classification Search
  CPC ............... G09B 15/04; G09B 15/023
  See application file for complete search history.

(56) References Cited

U.S. PATENT DOCUMENTS

| | | | |
|---|---|---|---|
| 4,321,853 | A | 3/1982 | Tumblin |
| 8,338,684 | B2 | 12/2012 | Pillhofer et al. |
| 2002/0004191 | A1 | 1/2002 | Tice et al. |
| 2014/0305284 | A1 | 10/2014 | Cosgrove |
| 2017/0358237 | A1* | 12/2017 | Yuen ............... G06F 3/0481 |

FOREIGN PATENT DOCUMENTS

| | | |
|---|---|---|
| CN | 201035769 Y | 3/2008 |
| CN | 201111744 Y | 9/2008 |
| CN | 104766505 A | 7/2015 |
| WO | 9317408 A1 | 9/1993 |

* cited by examiner

*Primary Examiner* — Robert W Horn
(74) *Attorney, Agent, or Firm* — Hamre, Schumann, Mueller & Larson, P.C.

(57) ABSTRACT

The present invention provides a computer-assisted method and a computer system for teaching a student to play a musical instrument having a keyboard, in particular a piano, which requires and allows the student to listen to a piece of music, before playing the music by analyzing and imitating what is heard and reading the notation of the music. The method and the system of the present invention enable the process of learning piano to become a fun and enjoyable game.

30 Claims, 8 Drawing Sheets

COMPUTER-ASSISTED METHOD AND COMPUTER SYSTEM FOR TEACHING PIANO

TECHNICAL FIELD OF THE INVENTION

This invention relates generally to a computer-assisted method and a computer system for music education, and particularly, to a computer-assisted method and a computer system for teaching students of all ages, especially children, to play a musical instrument having a keyboard, such as the piano.

BACKGROUND OF THE INVENTION

Most professional piano training focuses on 5 main areas of skill, these being: sight-reading, physical technique, theory, ear-training, and performance (not necessarily in that order). Each of these areas is important to the development of a well-rounded musician, but not treated equally in the traditional lesson structure. Traditional piano training primarily focuses on sight-reading from printed sheet music, physical technique, and performance preparation, whereas theory and ear training are usually taught on occasion, when time allows, or by other teachers outside the lesson. One of the single most important skills of good musicianship is the development of a musical ear, which oddly seems to be lacking in traditional piano lessons which favor note-reading over ear development.

In addition, the goal of the traditional piano lesson is to learn written pieces from music notation, acquire the technique necessary to surmount any technical obstacles in those pieces, and to perform said pieces in recitals. This process may take up to four to six months, and is entirely "goal oriented", allowing little time for the development of inner beat, pitch awareness and inner hearing, curiosity, creativity, or expression. It is not unusual that the student feels frustrated and stressed during this process, which may actually reduce the student's enthusiasm for piano playing.

Therefore, there is a need for a system and a method for teaching piano, which focus more on the training of a musical ear, and which allows the process of learning piano to be fun and enjoyable.

SUMMARY OF THE INVENTION

The present invention has a principle object of providing a system and a method for music education, especially for teaching piano, which requires and allows the student to listen to a piece of music, before playing the music by analyzing and imitating what is heard and reading the notation of the music. Furthermore, the present invention aims to provide a system and a method for music education, especially for teaching piano, which enables the process of learning piano to become a fun and enjoyable game.

In addition, the present invention aims to enable students to gain invaluable experience in ensemble performance through the hundreds of sound cues provided that will be listened to, copied, and performed with. It cannot be stressed too much that most music students are taking lessons in small studio rooms, playing in a purely soloistic mode. The present invention provides hundreds of opportunities to play "with others" and develop the important skills of cooperative independence, listening to others while playing other parts, and how to balance their sounds with the ensemble accompaniment. Musical performance is a social activity and the present invention aims to provide a "virtual" environment of playing with others.

These and other objects are satisfied by the present invention, which, in a first aspect thereof, provides a computer-assisted method for teaching a student to play a musical instrument having a keyboard, comprising: storing a plurality of pieces of music on a storage device; playing one of the pieces of music with a sound playing device for the student to listen to; providing the student with a playing assistance means for the student to perform a keyboard movement on the instrument according to the played piece of music, the keyboard movement producing a sound on the instrument, and the keyboard movement being selected from a group comprising a multiple-beat slide, a single-beat brush, a multiple-beat hold, a single-beat tap, and a rest; comparing, by means of a computing device, a clef, a duration and a pitch direction of the sound produced by the keyboard movement to a clef, a duration and a pitch direction of the played piece of music, respectively; providing the student with a plurality of visualization objects comprising information on the clef, the duration and the pitch direction of the stored pieces of music, for the student to select one of the visualization objects that matches the played piece of music.

Preferably, the method is adapted for teaching the student to play piano, and the musical instrument is a piano.

In an embodiment of the present invention, each of the pieces of music is a measure comprising four beats.

In an embodiment of the present invention, each beat comprises descending, ascending or static keys, and accompaniment/background music.

In an embodiment of the present invention, the sound playing device is a computer, and the storage device is a hard disk of the computer or a USB stick.

In an embodiment of the present invention, the sound playing device is a smart phone, and the storage device is part of the smart phone.

In an embodiment of the present invention, the playing assistance means comprises a holding portion adapted to be held by a hand of the student, and a sweeping portion extending from the holding portion.

In an embodiment of the present invention, the sweeping portion comprises a plurality of bristles adapted to be pressed on or swept over a keyboard of a piano.

In an embodiment of the present invention, the computing device is a computer or a smart phone.

In an embodiment of the present invention, the computing device is further configured to determine whether the visualization object selected by student matches the played piece of music.

In an embodiment of the present invention, the visualization objects are in the form of cards, on which information of the pieces of music is printed.

In an embodiment of the present invention, on each of the cards is printed information of a measure comprising four beats, said information comprising clef, duration and pitch direction of each of the beats.

In an embodiment of the present invention, the method further comprises providing a card holder, wherein the card correctly selected by the student is placed on the card holder.

In an embodiment of the present invention, the method further comprises providing the student with guidance for performing the keyboard movement if the keyboard movement performed by the student does not match the played piece of music.

In an embodiment of the present invention, the method further comprises providing the student with guidance for selecting the matching visualization object if the visualization object selected by student does not match the played piece of music.

A second aspect of the present invention provides a system for teaching a student to play a musical instrument having a keyboard, comprising: a storage device configured to store a plurality of pieces of music; a sound playing device for playing one of the pieces of music for a student to listen to; a playing assistance means for the student to perform a keyboard movement on the instrument according to the played piece of music, the keyboard movement producing a sound on the instrument, and the keyboard movement being selected from a group comprising a multiple-beat slide, a single-beat brush, a multiple-beat hold, a single-beat tap, and a rest; a computing device configured to compare a clef, a duration and a pitch direction of the sound produced by the keyboard movement to a clef, a duration and a pitch direction of the played piece of music, respectively; a plurality of visualization objects comprising information on the clef, the duration and the pitch direction of the stored pieces of music, for the student to select one of the visualization objects that matches the played piece of music.

Preferably, the system is adapted for teaching the student to play piano, and the musical instrument is a piano.

In an embodiment of the present invention, each of the pieces of music is a measure comprising four beats.

In an embodiment of the present invention, each beat comprises descending, ascending or static keys, and accompaniment/background music.

In an embodiment of the present invention, the sound playing device is a computer, and the storage device is a hard disk of the computer or a USB stick.

In an embodiment of the present invention, the sound playing device is a smart phone, and the storage device is part of the smart phone.

In an embodiment of the present invention, the playing assistance means comprises a holding portion adapted to be held by a hand of the student, and a sweeping portion extending from the holding portion.

In an embodiment of the present invention, the sweeping portion comprises a plurality of bristles adapted to be pressed on or swept over a keyboard of a piano.

In an embodiment of the present invention, the computing device is a computer or a smart phone.

In an embodiment of the present invention, the computing device is further configured to determine whether the visualization object selected by student matches the played piece of music.

In an embodiment of the present invention, the visualization objects are in the form of cards, on which information of the pieces of music is printed.

In an embodiment of the present invention, on each of the cards is printed information of a measure comprising four beats, said information comprising clef, duration and pitch direction of each of the beats.

In an embodiment of the present invention, the system further comprises a card holder adapted for holding the cards correctly selected by the student.

In an embodiment of the present invention, the computing device is further configured to provide the student with guidance for performing the keyboard movement if the keyboard movement performed by the student does not match the played piece of music.

In an embodiment of the present invention, the computing device is further configured to provide the student with guidance for selecting the matching visualization object if the visualization object selected by student does not match the played piece of music.

DETAILED DESCRIPTION OF THE INVENTION

The present invention is an ear-training approach intended for use in the introductory piano lesson. The method of the present invention is not meant as a replacement for piano lessons, but rather designed as an enhancement module to be used within the lesson, offering an intensified series of experiences in an area of basic musicianship that is often overlooked: the development of a quick, accurate and analytical musical ear. In addition, the method of the present invention provide early musical education in the form of a fun and educational game, which students love to play again and again, while gaining confidence and skills.

Figure 1:
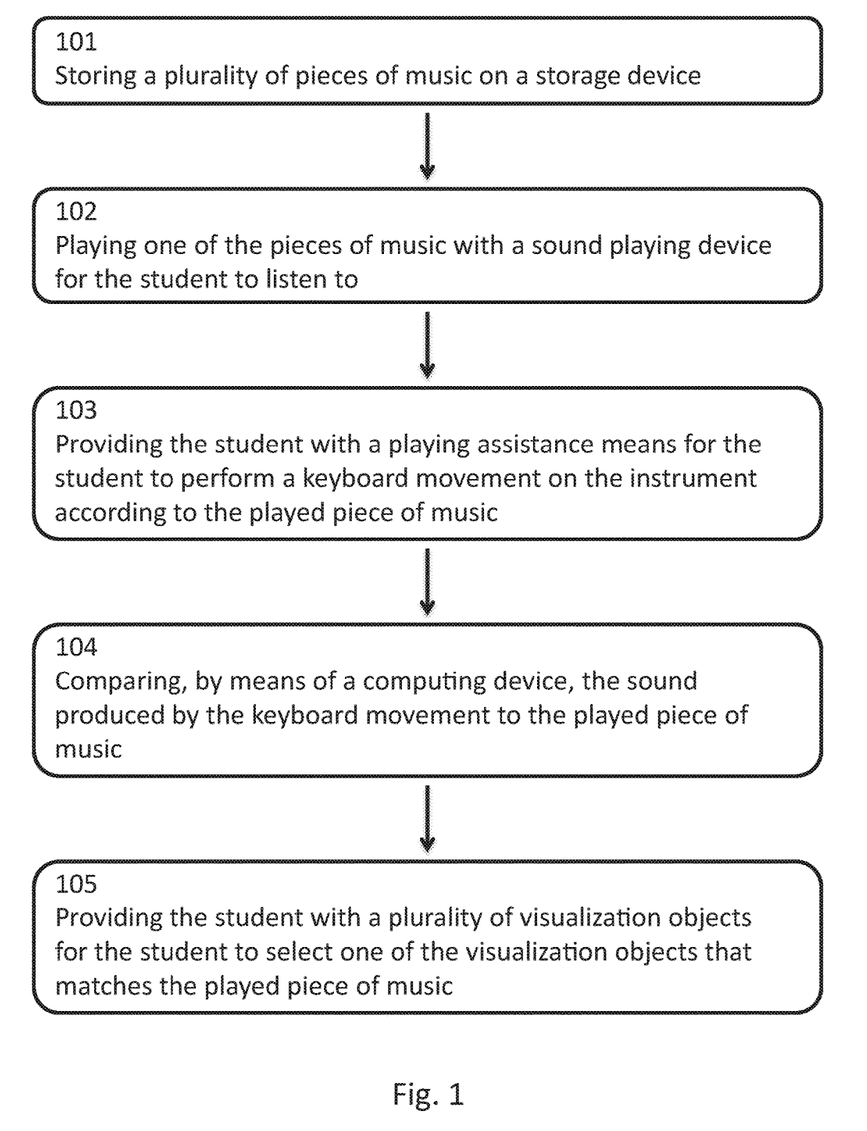
FIG. 1 is a flow chart of a computer-assisted method for teaching a student to play a musical instrument having a keyboard according to an embodiment of the present invention.
Figure 2A:
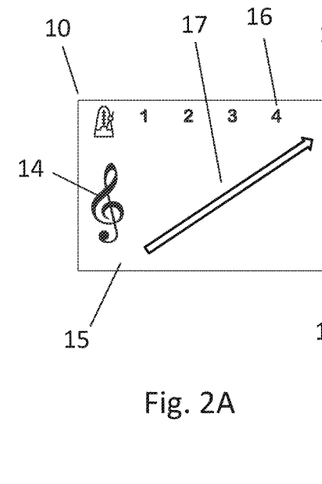
FIG. 2A is a planar view of a visualization object of a system for teaching a student to play a musical instrument having a keyboard according to an embodiment of the present invention.
Figure 2B:
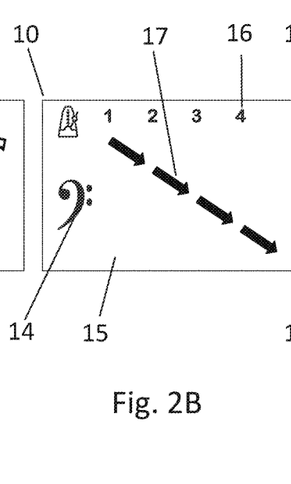
FIG. 2B is a planar view of a visualization object of a system for teaching a student to play a musical instrument having a keyboard according to an embodiment of the present invention.
Figure 2C:
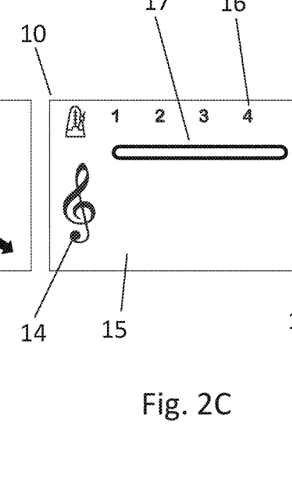
FIG. 2C is a planar view of a visualization object of a system for teaching a student to play a musical instrument having a keyboard according to an embodiment of the present invention.
Figure 2D:
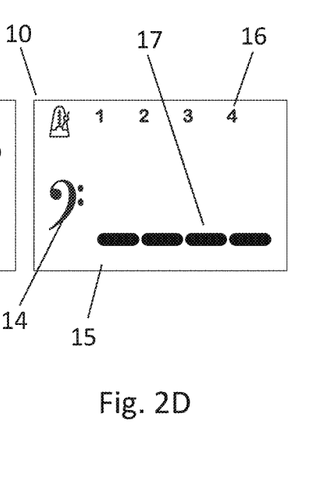
FIG. 2D is a planar view of a visualization object of a system for teaching a student to play a musical instrument having a keyboard according to an embodiment of the present invention.

Referring now to the drawings, FIG. 1 shows a process flow of the computer-assisted method of teaching piano according to an embodiment of the present invention.

In step 101, a plurality of pieces of music are stored on a storage device. The storage device can be any data storage device known in the art, for example, a cassette, a CD, a DVD, a hard disk of a computer, a USB stick, the storage module of a smart phone, etc.

Each of the plurality of pieces of music (hereinafter referred to as "AudioQ") is a measure having a length of four beats, and each beat may comprise descending, ascending or static keys, as well as accompaniment/background music. As shown in FIGS. 2A-3D, the AudioQs comprise music produced by four different types of movements on the keyboard of the piano: slides (multi-beat glissandos), brushes (single-beat glissandos), holds (pressing the keyboard for multi-beat durations) and taps (single-beat pressing). The AudioQs may further comprise multiple-beat or single-beat rests, which are silent beats.

Figure 4:
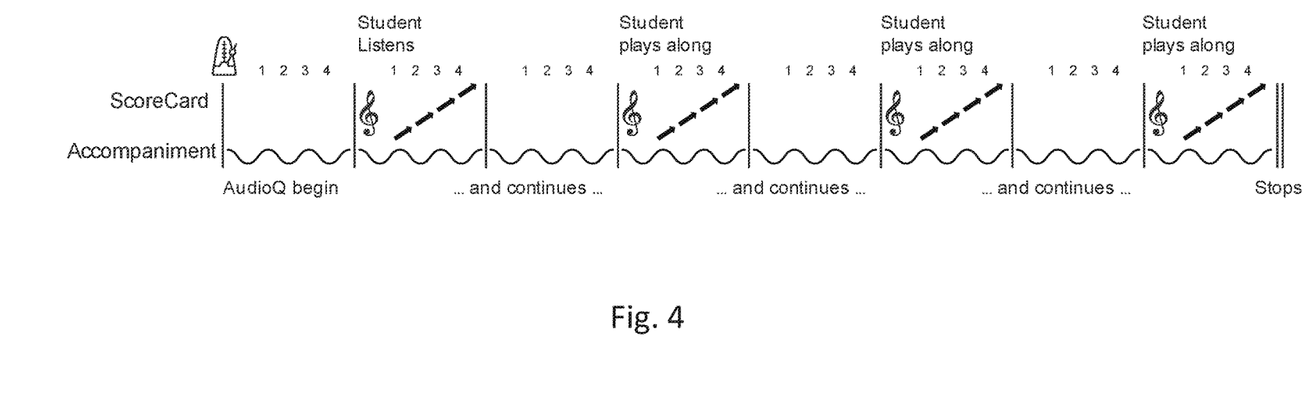
FIG. 4 is a schematic view illustrating a piece of music stored on a storage device being repeatedly played four times in a step of a computer-assisted method for teaching a student to play a musical instrument having a keyboard according to an embodiment of the present invention.

In step 102, one of the AudioQs stored on the storage device is played with a sound playing device for a student to listen to. The sound playing device can be any device that can playback the stored pieces of music known in the art, such as a cassette player, a CD player, a DVD player, a computer, a smart phone, etc. The manner in which the selected AudioQ is played in shown in FIG. 4. Basically each AudioQ is a continuous play of 8 measures. An AudioQ has two different types of measure content: (1) a measure of only the accompaniment/background music, (2) a measure of the accompaniment/background music together with the piano part that contains the sounds of keyboard movements. These two types of measure are played alternately for four times each.

Figure 5:
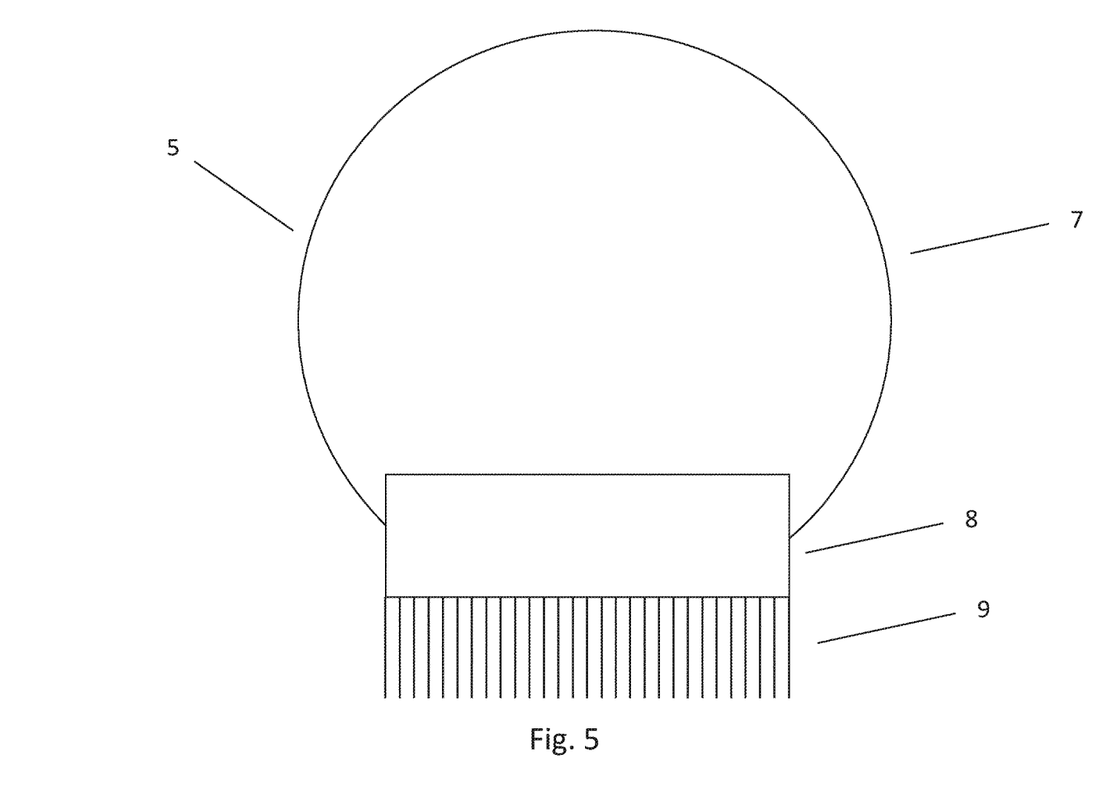
FIG. 5 is a schematic view illustrating a playing assistance means of a system for teaching a student to play a musical instrument having a keyboard according to an embodiment of the present invention.

After listening to the AudioQ played in step 102, the student may try to imitate the played AudioQ by performing the corresponding keyboard movements (step 103). Preferably, a playing assistance means is provided to the student for the imitation of the played AudioQ. As shown in FIG. 5, the playing assistance means 5 (hereinafter referred to as the "KeySweep") comprises a holding portion 7 adapted to be held by a hand of the student, and a sweeping portion 8 extending from the holding portion 7. The sweeping portion 8 comprises a plurality of bristles 9 adapted to be pressed on or swept over a keyboard of a piano.

The KeySweep provides at least the following advantages: it creates smooth, effortless and liquid glissandi, protects the fingers of the student from becoming bruised, protects the keyboard from excessive jarring, scraping, and bumping, and removes the fear of playing wrong notes. In addition, the Key Sweep also helps shape the palms of the hands of the student into cupped arches that can later contribute to a more effective hand shape for basic piano techniques.

Two Key Sweeps may be provided to the student for the left and right hands, respectively. The two Key Sweeps are held in the palms of the hands and used on the keyboard, instead of the fingers. They are moved right and left along the white keys in a gentle sliding motion, not unlike varnishing a tabletop or ironing a shirt. The broad face of the brush lies in line with the white keys.

After listening to the AudioQ played for the first time, the student may determine whether the AudioQ comprises keys in the treble clef (to be imitated by keyboard movement of the right hand) or the bass clef (to be imitated by keyboard movement of the left hand), the durations of the keys (multi-beat or single-beat) and the pitch direction of the keys (descending, ascending or static).

In this step, sounds are immediately converted into imitative physical movements on the keyboard, leading to increased concentration and cognitive awareness. The students must determine the registers of the sounds (treble/bass) and therefore, which hands to use—right or left. The student must also determine whether the AudioQs are ascending, descending, or static (not moving up or down), and which, if any, beats are silent (not heard but physically experienced). Furthermore, the student must also discern between four different types of keyboard movements: Slides, Brushes, Holds, and Taps.

The keyboard of the piano is roughly divided into treble range (approximately from Middle C to the highest far right keys), and bass range (approximately from Middle C to the lowest far left keys). During play, the student initially places the KeySweep as close as possible to the starting key position heard in the AudioQ. For example, if an AudioQ starts around Middle C and ascends the full treble range to the far right, the student should begin on or near the Middle C cluster—a few notes above or below does not matter.

In step 104, whether the student's imitation of the played piece of music is correct is determined. The determination may be conducted either by a teacher, or by a computing device, such as a computer or a smart phone, with specifically-designed software installed thereon. The determination is carried out according to a set of pre-determined criteria regarding the clef, duration and pitch direction of each of the beats. It should be noted that the pre-determined criteria do not require the student to play the exact keys accurately on the keyboard of the piano. Rather, the student is only required to determine the clef, duration and pitch direction of the AudioQ. As long as the student correctly determines and imitates the AudioQ in these three aspects, the imitation is determined to be correct, even though the student may not have played the exact same keys as those in the AudioQ.

If the student fails to imitate the played AudioQ correctly, the teacher or the computing device may help the student by providing some guidance for imitating the played AudioQ. For example, the teacher may illustrate arm gestures to the student and may ask leading questions such as: "Is the sound getting higher or lower?", "Is it the right hand or the left?", "Is it a long sound or a series of shorter sounds". In the case of the computing device replacing the teacher, the computing device may display these arm gestures on a display thereof and/or play the pre-recorded leading questions for the student to hear.

Figure 3A:
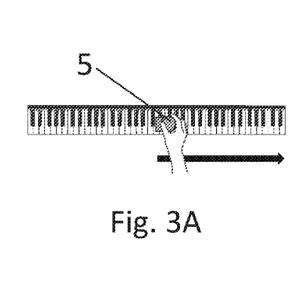
FIG. 3A is a schematic view illustrating a keyboard movement corresponding to the visualization object shown in FIG. 2A.
Figure 3B:
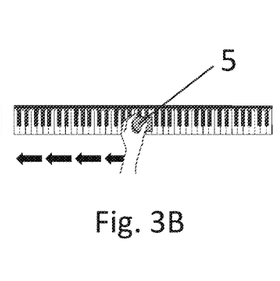
FIG. 3B is a schematic view illustrating a keyboard movement corresponding to the visualization object shown in FIG. 2B.
Figure 3C:
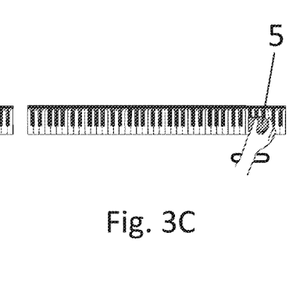
FIG. 3C is a schematic view illustrating a keyboard movement corresponding to the visualization object shown in FIG. 2C.
Figure 3D:
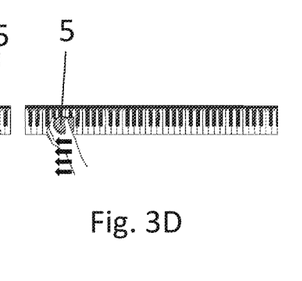
FIG. 3D is a schematic view illustrating a keyboard movement corresponding to the visualization object shown in FIG. 2D.

The AudioQ may be repeatedly played until the student imitates it correctly, according to the pre-determined criteria. Then, in step 105, the student is provided with a plurality of visualization objects for the student to select one of the visualization objects that is corresponding to the played AudioQ. In this embodiment, the visualization objects are in the form of cards (hereinafter referred to as "ScoreCards"), on which information of the pieces of music is printed. As shown in FIGS. 2A-2D, on each of the ScoreCards is printed information of a measure comprising four beats, said information comprising clef, duration and pitch direction of each of the beats. Each of the ScoreCards 10 is a rectangular card made of paper or plastic, or any other commonly used materials in the art. A treble symbol or a bass symbol is printed in a left portion 14 of a surface 15 of the ScoreCard 10, and the numbers 1, 2, 3 and 4 are printed in a top portion 16 of the surface 15 of the ScoreCard 10, indicating the number of beats in the measure. In a bottom right portion 17 of the surface 15 of the ScoreCard 10, arrows or bars with different directions and/or lengths are printed, representing the durations and pitch directions of the corresponding piece of music. For example, in the ScoreCard shown in FIG. 2A, there is printed an arrow pointing to the top right corner of the surface 15 of the ScoreCard 10, representing a single 4-beat ascending slide in the treble clef (that is, a keyboard movement to be performed by the right hand, as shown in FIG. 3A); in the ScoreCard shown in FIG. 2B, there are printed 4 arrows in sequence pointing to the bottom right corner of the surface 15 of the ScoreCard 10, representing 4 single-beat descending brushes in the bass clef (corresponding to the left hand keyboard movement as shown in FIG. 3B); in the ScoreCard shown in FIG. 2C, there is printed a horizontal bar in an upper portion of the bottom right portion 17 of the surface 15, representing a single 4-beat hold in the treble clef (corresponding to the right hand keyboard movement as shown in FIG. 3C); and in the ScoreCard shown in FIG. 2D, there are printed 4 single-beat bars in a lower portion of the bottom right portion 17 of the surface 15, representing 4 single-beat taps in the bass clef (corresponding to the left hand keyboard movement as shown in FIG. 3D).

Figure 6:
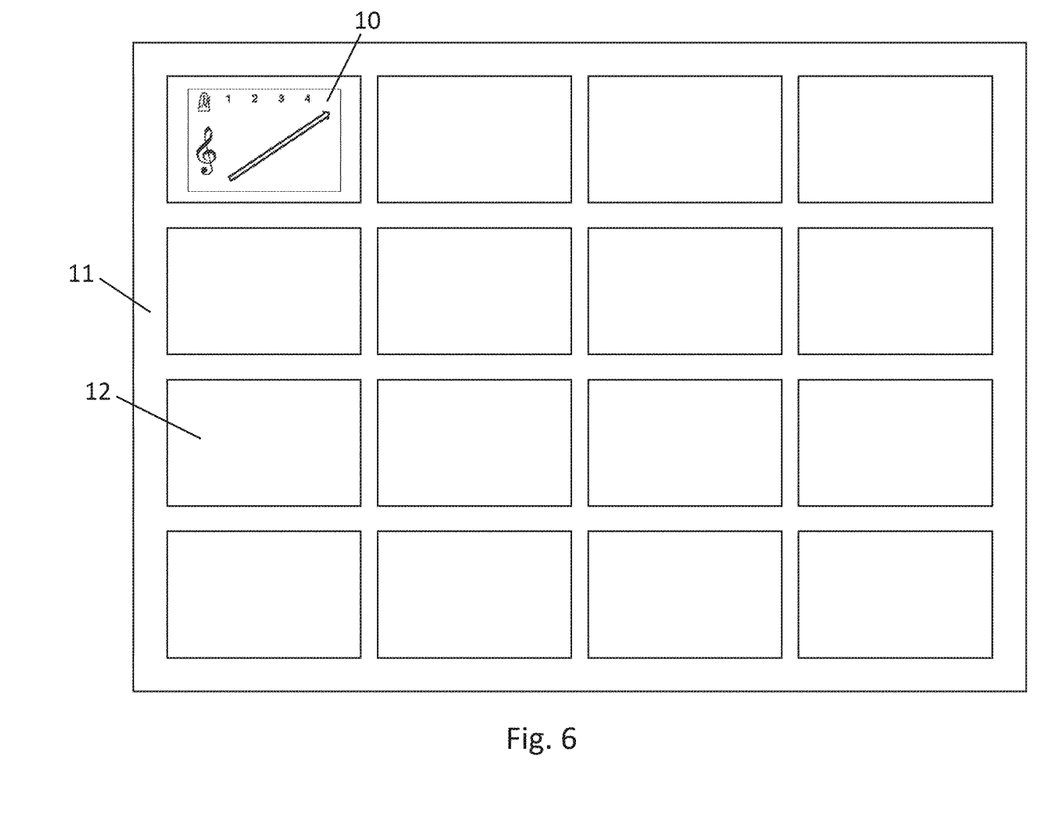
FIG. 6 is a schematic view illustrating a card holder of a system for teaching a student to play a musical instrument having a keyboard according to an embodiment of the present invention.

If the student selects the ScoreCard that corresponds to the played AudioQ correctly, the correctly selected ScoreCard will be placed on a corresponding slot on a card holder (as shown in FIG. 6). Otherwise, the student will be provided (by the teacher or by the computing device) with guidance for selecting the corresponding ScoreCard.

The card holder 11 comprises 16 slots 18 for holding 16 ScoreCards 10, corresponding to 16 AudioQs. After 16 ScoreCards have been placed on the card holder 11, that is, after a set of 16 AudioQs have been correctly imitated by the student, the 16 AudioQs corresponding to the ScoreCards may be played continuously according to the sequence in which they are placed on the card holder. The ScoreCards corresponding to the continuously played 16 AudioQs are referred to as a "Score". Each score may be accompanied by 1 of 6 RecitalQs. There are two types of RecitalQs: one that includes a performance of the 16 selected ScoreCards plus the accompaniment/background music (referred to as "Play-Along RecitalQ"), and the other with only the accompaniment/background music (referred to as "Solo RecitalQ"). The Play-Along RecitalQ is played and the student sight-reads the Score. If this performance is successful, then the student plays again with the Solo RecitalQ. In this way, the student will feel like he or she has learned to play a complete piece of music work, and thus have a sense of achievement, which will enhance his or her interest in learning piano.

Figure 8A:
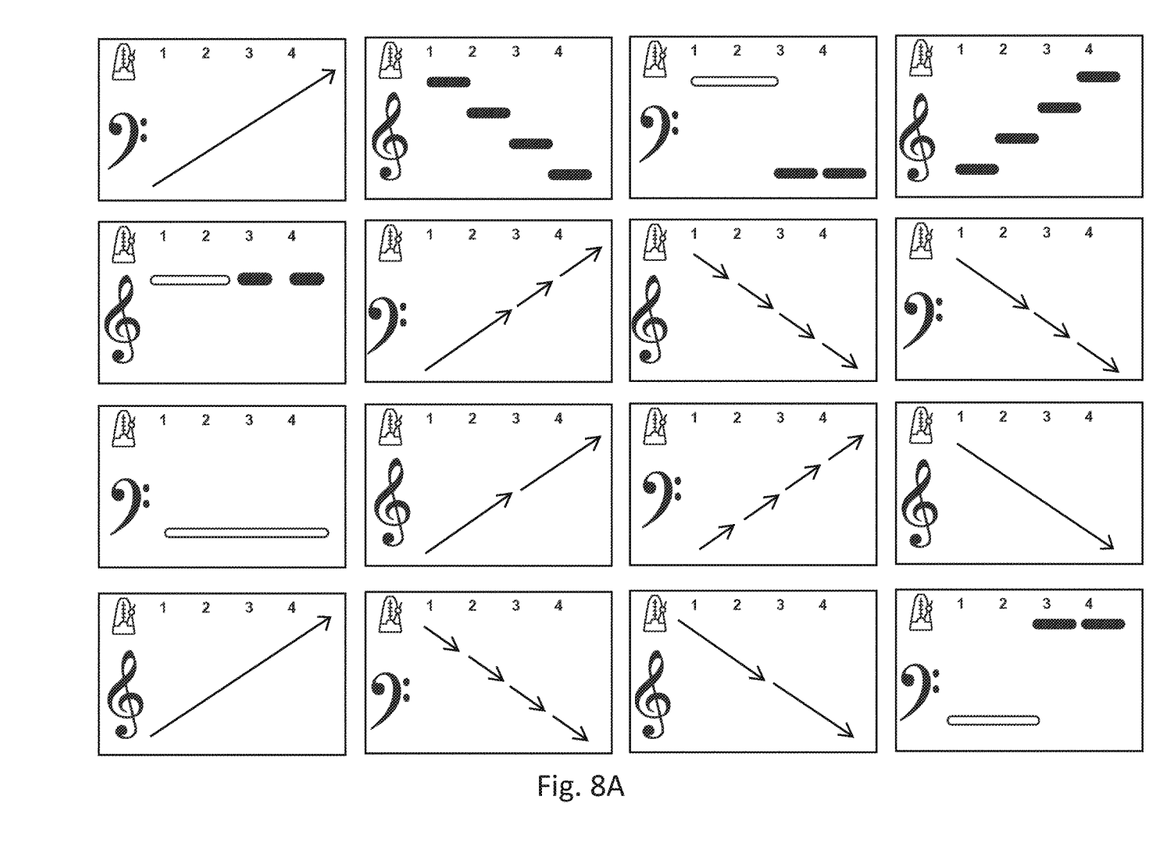
FIG. 8A is a schematic view illustrating a score of 16 measures of music used in a computer-assisted method for teaching a student to play a musical instrument having a keyboard according to an embodiment of the present invention.
Figure 8B:
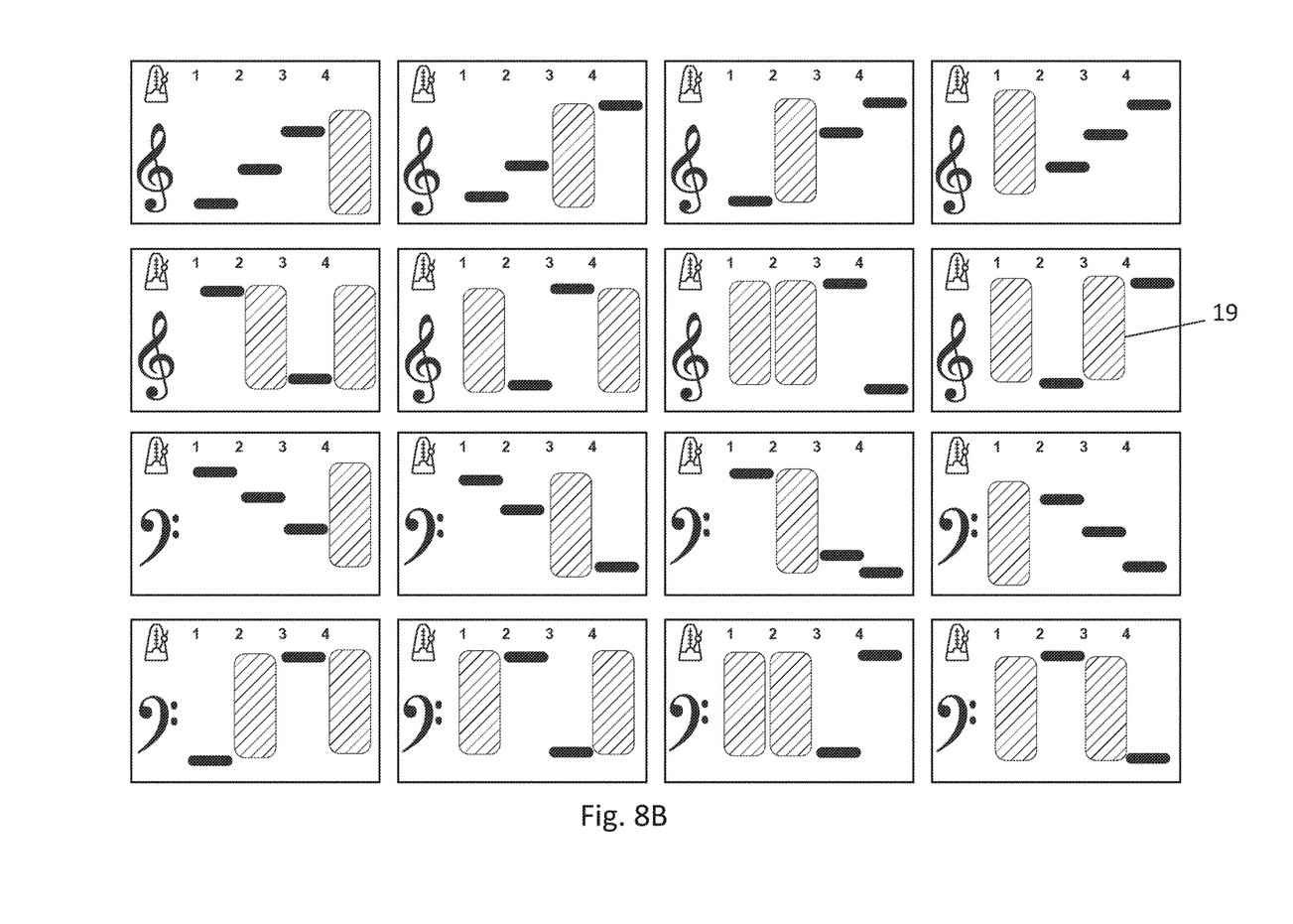
FIG. 8B is a schematic view illustrating another score of 16 measures of music used in a computer-assisted method for teaching a student to play a musical instrument having a keyboard according to an embodiment of the present invention.

For example, FIG. 8A schematically shows a score of 16 AudioQs corresponding to four types of keyboard movements: Slides, Brushes, Holds, and Taps, and FIG. 8B shows another score of 16 AudioQs corresponding to the keyboard movements of Taps as well as rests (silent beats, indicated by reference sign 19 in FIG. 8B).

When the student is ready to perform a completed score, the focus shifts from "hear-play" to "see-play", which is a far more familiar world of looking at sheet music and playing from notation. The method of the present invention offers excellent practice in learning how to sight-read in a focused, concentrated, and continuous manner. Once an RecitalQ has begun, the student must play all 16 measures without stopping. If they lose their place they must not stop but recover their place and end in the sixteenth measure on time.

After the student has successfully completed the 16 AudioQs in a score, the cards placed on the card holder can be rearranged into many new combinations to create more challenging scores and sight-reading experiences. Furthermore, when all 16 scores have been completed, all the ScoreCards may be mixed together to create an assortment of new super-scores and super-challenges. Any of the Solo RecitalQs can be used to accompany these very challenging scores.

Table 1 shows a complete set of the plurality of pieces of music stored on the storage device, comprising four decks (Deck A-Deck D), each deck comprising 4 scores. The decks are arranged in a sequence of increasing difficulty. Each score comprises 16 AudioQs and 6 RecitalQs (3 Play-Along RecitalQs with different speeds, and 3 Solo RecitalQs with different speeds). Therefore, the complete set comprises 352 pieces of music. As can be seen in Table 1, the Deck A of the ScoreCards correspond to the keyboard movements of multiple-beat slides and single-beat brushes. The first two scores of Deck A correspond to keyboard movements to be performed by either the right hand (represented as "RH" in Table 1) or the left hand (represented as "LH" in Table 1), while the last two scores of Deck A correspond to keyboard movements to be performed by both the right hand and the left hand, thus forming an ascending difficulty gradient. The same arrangement is also applied to Deck B which corresponds to the keyboard movements of multiple-beat holds and single-beat taps, and Deck C which comprises scores corresponding to all the four types of keyboard movements. Deck D comprises scores corresponding the all the above four types of keyboard movements, as well as the rests (that is, empty beats). It can also be seen in Table 1 that each score comprises 3 Play-Along RecitalQs (with speed from slow to fast) and 3 Solo RecitalQs (with speed from slow to fast) in addition to the 16 AudioQs.

TABLE 1

| AudioQs and RecitalQs | | | | | | | | | |
|---|---|---|---|---|---|---|---|---|---|
| Score | | | | Play-Along RecitalQs | | | Solo RecitalQs | | |
| Deck | # | Title | Audio Qs | Slow | Med. | Fast | Slow | Med. | Fast |
| A | 1 | RH Slides & Brushes | PB 1.1-1.16 | 1.17 | 1.18 | 1.19 | 1.20 | 1.21 | 1.22 |
| A | 2 | LH Slides & Brushes | PB 2.1-2.16 | 2.17 | 2.18 | 2.19 | 2.20 | 2.21 | 2.22 |

TABLE 1-continued

AudioQs and RecitalQs

| Score | | | | Play-Along RecitalQs | | | Solo RecitalQs | | |
| --- | --- | --- | --- | --- | --- | --- | --- | --- | --- |
| Deck | # | Title | Audio Qs | Slow | Med. | Fast | Slow | Med. | Fast |
| A | 3 | Hands in Alternation | PB 3.1-3.16 | 3.17 | 3.18 | 3.19 | 3.20 | 3.21 | 3.22 |
| A | 4 | Quick Hand Mix | PB 4.1-4.16 | 4.17 | 4.18 | 4.19 | 4.20 | 4.21 | 4.22 |
| B | 5 | RH Holds & Taps | PB 5.1-5.16 | 5.17 | 5.18 | 1.19 | 5.20 | 5.21 | 5.22 |
| B | 6 | LH Holds & Taps | PB 6.1-6.16 | 6.17 | 6.18 | 2.19 | 6.20 | 6.21 | 6.22 |
| B | 7 | Hands in Alternation | PB 7.1-7.16 | 7.17 | 7.18 | 3.19 | 7.20 | 7.21 | 7.22 |
| B | 8 | Quick Hand Mix | PB 8.1-8.16 | 8.17 | 8.18 | 4.19 | 8.20 | 8.21 | 8.22 |
| C | 9 | RH Slide-Brush-Hold-Tap | PB 9.1-9.16 | 9.17 | 9.18 | 9.19 | 9.20 | 9.21 | 9.22 |
| C | 10 | LH Slide-Brash-Hold-Tap | PB 10.1-10.16 | 10.17 | 10.18 | 10.19 | 10.20 | 10.21 | 10.22 |
| C | 11 | Hands in Alternation | PB 11.1-11.16 | 11.17 | 11.18 | 11.19 | 11.20 | 11.21 | 11.22 |
| C | 12 | Quick Hand Mix | PB 12.1-12.16 | 12.17 | 12.18 | 12.19 | 12.20 | 12.21 | 12.22 |
| D-1 | 13 | Rest Series A | PB 13.1-13.16 | 13.17 | 13.18 | 13.19 | 13.20 | 13.21 | 13.22 |
| D-1 | 14 | Rest Series B | PB 14.1-14.16 | 14.17 | 14.18 | 14.19 | 14.20 | 14.21 | 14.22 |
| D-2 | 15 | Singles & Doubles A | PB 15.1-15.16 | 15.17 | 15.18 | 15.19 | 15.20 | 15.21 | 15.22 |
| D-2 | 16 | Singles & Doubles B | PB 16.1-16.16 | 16.17 | 16.18 | 16.19 | 16.20 | 16.21 | 16.22 |

Figure 7:
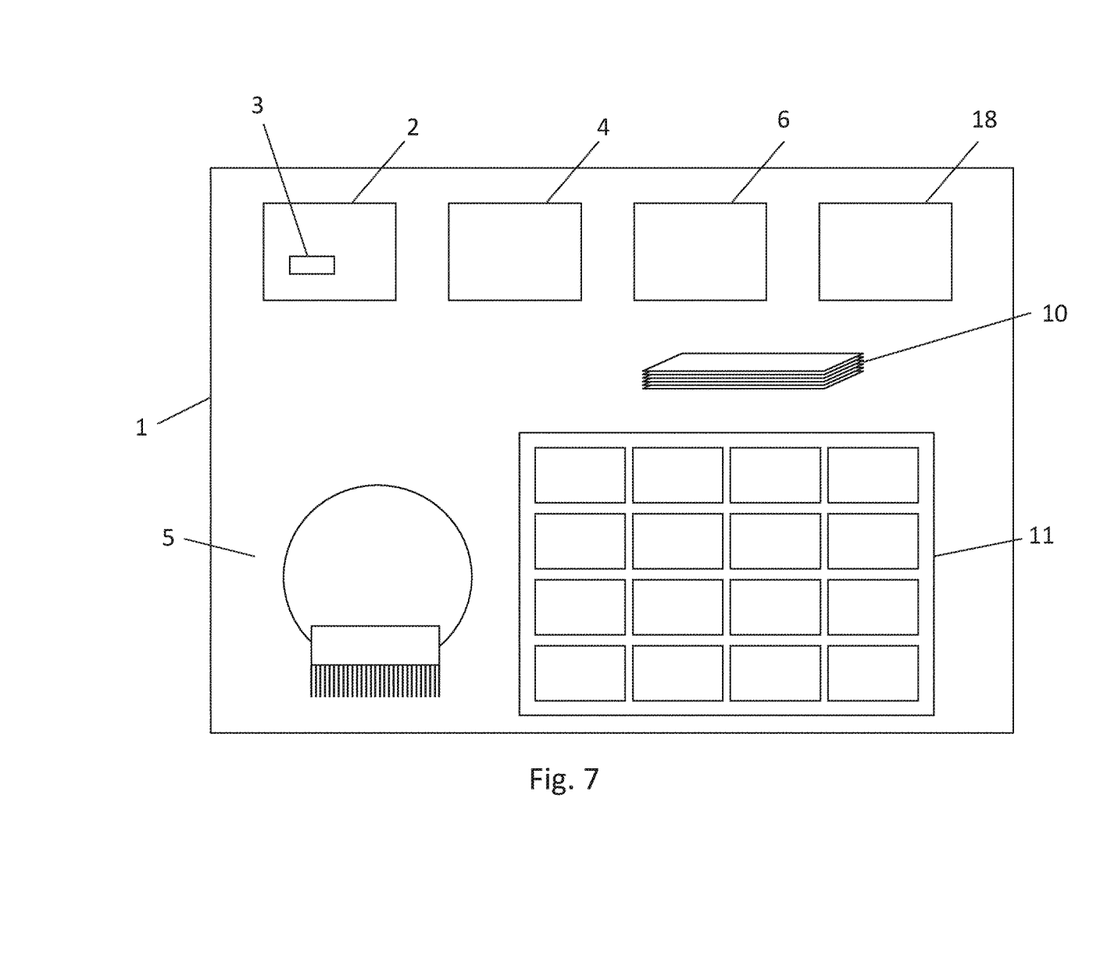
FIG. 7 is a schematic view illustrating a system for teaching a student to play a musical instrument having a keyboard according to an embodiment of the present invention.

A second aspect of the present invention provides a system for teaching a student to play a musical instrument having a keyboard, particularly a piano. As shown in FIG. 7, the system 1 comprises a storage device 2 configured to store a plurality of pieces of music 3, a sound playing device 4 for playing one of the pieces of music 3 for a student to listen to, a playing assistance means 5 (see FIG. 5) for the student to perform a keyboard movement on the instrument according to the played piece of music, and a computing device 6. The keyboard movement on the instrument is selected from a group comprising a multiple-beat slide, a single-beat brush, a multiple-beat hold, a single-beat tap (see FIGS. 2A-3D), and a rest (see reference sign 19 in FIG. 8B), and produces a sound on the instrument accordingly. The computing device 6 is configured to compare a clef, a duration and a pitch direction of the sound produced by the keyboard movement to a clef, a duration and a pitch direction of the played piece of music, respectively.

Each of the pieces of music 3 is a measure comprising four beats, each beat comprising descending, ascending or static keys. Preferably, the storage device 2, the sound playing device 4 and the computing device 6 are integrated in a single device. For example, the computing device 6 may be a computer comprising a processor for performing the comparison between the sound produced by the keyboard movement by the student and the played piece of music. The sound playing device 4 may be a module of the computer responsible for playing sounds, such as a sound card, and the storage device 2 may be another module of the computer responsible for storage of data, such as the hard disk of the computer. As another example, the computing device 6 may be a smart phone comprising a processor for performing the comparison between the sound produced by the keyboard movement by the student and the played piece of music. The sound playing device 4 may be a module of the smart phone responsible for playing sounds, and the storage device 2 may be another module of the smart phone responsible for storage of data.

Alternatively, the storage device 2 may be any other storage device in the art, and the sound playing device 4 may be any other device in the art that is able to play the pieces of music 3 stored on the storage device 2. For example, the storage device 2 may be a compact disk (CD), and the sound playing device 4 may be a CD player, correspondingly.

The system 1 of the present invention further comprises a plurality of visualization objects 10. In this embodiment, the visualization objects 10 are in the form of cards (also referred to as "ScoreCards"). As shown in FIGS. 2A-2D, on each of the ScoreCards 10 is printed information on the clef, the duration and the pitch direction of one of the pieces of music 3 stored on the storage device 2.

Furthermore, the system 1 comprises a card holder 11 (also referred to as "ScoreBoard"). As shown in FIG. 6, the ScoreBoard 11 is in the form of a flat plate comprising 16 slots 12 arranged in four rows. Each of the slots 12 is adapted to hold a ScoreCard 10. After the student listens to and successfully imitates the played piece of music, the student is required to select one of the ScoreCards 10 that comprises information (clef, duration, pitch direction) matching the played piece of music, and place the selected ScoreCard 10 into one of the slots 12 on the ScoreBoard 11. This process is repeated for 15 more times, and the 16 selected ScoreCards are place into the 16 slots 12 on the ScoreBoard 11 in sequence. After that, the Play-Along RecitalQs are played and the student plays along while reading the 16 ScoreCards 10 placed on the ScoreBoard 11. Finally, the Solo RecitalQs are played and the student is required to play the whole score comprising 16 measures (that is, perform the corresponding keyboard movements with the KeySweeps 5) with only the 16 ScoreCards 10 placed on the ScoreBoard 11 as a guidance.

In addition, the system 1 may further comprises instructions 18 for how to use the system 1 to teach a student to play a musical instrument having a keyboard, in particular a piano. The instructions 18 may be in the form of a manual book, instructional video or audio files, or any other forms known in the art.

While the present invention is described in connection with what is presently considered to be the most practical and preferred embodiment, it should be appreciated that the invention is not limited to the disclosed embodiment, and is intended to cover various modifications and equivalent arrangements included within the scope of the claims. Modifications and variations in the present invention may be made without departing from the novel aspects of the invention as defined in the claims, and this application is limited only by the scope of the claims. In particular, although the present invention has been described as a method and a system for teaching piano in the above embodiment, it should be noted that the principles of the present invention can also be applied to the teaching of any other musical instruments and even to the teaching of singing.

What is claimed is:

1. A system for teaching a student to play a musical instrument having a keyboard, comprising:
   a storage device configured to store a plurality of pieces of music;
   a sound playing device for playing one of the pieces of music for a student to listen to;
   a playing assistance means for the student to perform a keyboard movement on the instrument according to the played piece of music, the keyboard movement producing a sound on the instrument, and the keyboard movement being selected from a group comprising a multiple-beat slide, a single-beat brush, a multiple-beat hold, a single-beat tap, and a rest;
   a computing device configured to compare a clef, a duration and a pitch direction of the sound produced by the keyboard movement to a clef, a duration and a pitch direction of the played piece of music, respectively;
   a plurality of visualization objects comprising information on the clef, the duration and the pitch direction of the stored pieces of music, for the student to select one of the visualization objects that matches the played piece of music.

2. The system according to claim 1, wherein the system is adapted for teaching the student to play piano, and the musical instrument is a piano.

3. The system according to claim 1, wherein each of the pieces of music is a measure comprising four beats.

4. The system according to claim 3, wherein each beat comprises descending, ascending or static keys, and accompaniment/background music.

5. The system according to claim 1, wherein the sound playing device is a computer, and the storage device is a hard disk of the computer or a USB stick.

6. The system according to claim 1, wherein the sound playing device is a smart phone, and the storage device is part of the smart phone.

7. The system according to claim 1, wherein the playing assistance means comprises a holding portion adapted to be held by a hand of the student, and a sweeping portion extending from the holding portion.

8. The system according to claim 7, wherein the sweeping portion comprises a plurality of bristles adapted to be pressed on or swept over a keyboard of a piano.

9. The system according to claim 1, wherein the computing device is a computer or a smart phone.

10. The system according to claim 1, wherein the computing device is further configured to determine whether the visualization object selected by student matches the played piece of music.

11. The system according to claim 1, wherein the visualization objects are in the form of cards, on which information of the pieces of music is printed.

12. The system according to claim 11, wherein on each of the cards is printed information of a measure comprising four beats, said information comprising clef, duration and pitch direction of each of the beats.

13. The system according to claim 12, further comprising a card holder adapted for holding the cards correctly selected by the student.

14. The system according to claim 1, wherein the computing device is further configured to provide the student with guidance for performing the keyboard movement if the keyboard movement performed by the student does not match the played piece of music.

15. The system according to claim 1, wherein the computing device is further configured to provide the student with guidance for selecting the matching visualization object if the visualization object selected by student does not match the played piece of music.

16. A computer-assisted method for teaching a student to play a musical instrument having a keyboard, comprising:
   storing a plurality of pieces of music on a storage device;
   playing one of the pieces of music with a sound playing device for the student to listen to;
   providing the student with a playing assistance means for the student to perform a keyboard movement on the instrument according to the played piece of music, the keyboard movement producing a sound on the instrument, and the keyboard movement being selected from a group comprising a multiple-beat slide, a single-beat brush, a multiple-beat hold, a single-beat tap, and a rest;
   comparing, by means of a computing device, a clef, a duration and a pitch direction of the sound produced by the keyboard movement to a clef, a duration and a pitch direction of the played piece of music, respectively;
   providing the student with a plurality of visualization objects comprising information on the clef, the duration and the pitch direction of the stored pieces of music, for the student to select one of the visualization objects that matches the played piece of music.

17. The method according to claim 16, wherein the method is adapted for teaching the student to play piano, and the musical instrument is a piano.

18. The method according to claim 16, wherein each of the pieces of music is a measure comprising four beats.

19. The method according to claim 18, wherein each beat comprises descending, ascending or static keys, and accompaniment/background music.

20. The method according to claim 16, wherein the sound playing device is a computer, and the storage device is a hard disk of the computer or a USB stick.

21. The method according to claim 16, wherein the sound playing device is a smart phone, and the storage device is part of the smart phone.

22. The method according to claim 16, wherein the playing assistance means comprises a holding portion adapted to be held by a hand of the student, and a sweeping portion extending from the holding portion.

23. The method according to claim 22, wherein the sweeping portion comprises a plurality of bristles adapted to be pressed on or swept over a keyboard of a piano.

24. The method according to claim 16, wherein the computing device is a computer or a smart phone.

25. The method according to claim 16, wherein the computing device is further configured to determine whether the visualization object selected by student matches the played piece of music.

26. The method according to claim 16, wherein the visualization objects are in the form of cards, on which information of the pieces of music is printed.

27. The method according to claim 26, wherein on each of the cards is printed information of a measure comprising four beats, said information comprising clef, duration and pitch direction of each of the beats.

28. The method according to claim 27, further comprising providing a card holder, wherein the card correctly selected by the student is placed on the card holder.

29. The method according to claim 16, further comprising providing the student with guidance for performing the keyboard movement if the keyboard movement performed by the student does not match the played piece of music.

30. The method according to claim 16, further comprising providing the student with guidance for selecting the matching visualization object if the visualization object selected by student does not match the played piece of music.

* * * * *